Nov. 14, 1950 — R. D. HOAK — 2,529,874
PROCESS FOR MANUFACTURING AMMONIUM SALTS AND MAGNETIC
IRON OXIDE FROM SOLUTIONS OF FERROUS SALTS
Filed Sept. 27, 1947
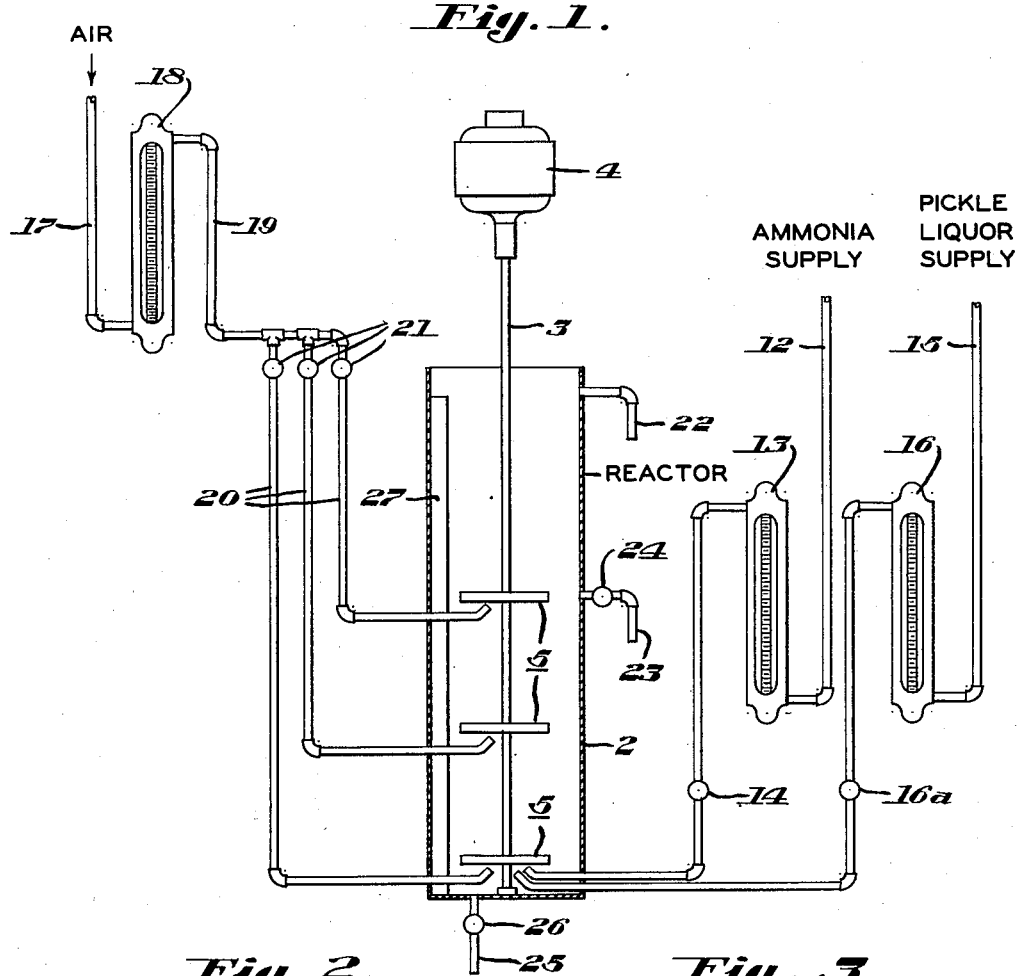
*Fig. 1.*
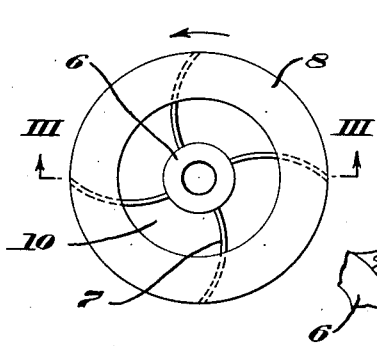
*Fig. 2.*
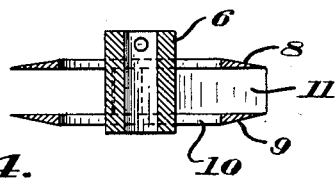
*Fig. 3.*
*Fig. 4.*
INVENTOR
RICHARD D. HOAK Patented Nov. 14, 1950

2,529,874

UNITED STATES PATENT OFFICE 2,529,874

PROCESS FOR MANUFACTURING AMMONIUM SALTS AND MAGNETIC IRON OXIDE FROM SOLUTIONS OF FERROUS SALTS

Richard D. Hoak, Mount Lebanon Township, Allegheny County, Pa., assignor to Mellon Institute of Industrial Research, Pittsburgh, Pa., a corporation of Pennsylvania Application September 27, 1947, Serial No. 776,504

5 Claims. (Cl. 23—200)

This invention relates to a process for producing pure ammonium salt and a rapidly settling magnetic iron oxide from waste pickle liquor, or liquor of similar composition, and purified ammonia gas or aqua ammonia.

Spent pickle liquor, a waste product of the steel industry, is produced in very large volume from an operation whereby the oxide scale is removed from steel products, prior to further processing, by immersing them in a bath of dilute sulphuric acid. This liquor is predominantly an aqueous solution of ferrous sulphate and free sulphuric acid. The composition of waste pickle liquor will normally fall in the range of 10% to 20% $FeSO_4$ and 0.5% to 10% $H_2SO_4$. A liquor of compositions similar to that of waste pickle liquor is produced in large volume in the manufacture of certain pigments, especially titanium dioxide. Some steel products are pickled with hydrochloric acid, for example, steel wire, and the resultant spent pickle liquor contains ferrous chloride and hydrochloric acid.

The economical disposal of waste ferrous sulphate solutions, as for example, waste pickle liquor, or liquors of similar composition, constitutes a serious problem. In many cases no alternative remains but to treat the liquor with lime, or some other alkaline agent, to prevent its discharge into streams where it would become an objectionable pollutant. This is a costly procedure because no by-product of value is obtained. A process whereby waste pickle liquor can be profitably employed is obviously of public benefit.

Large quantities of ammonia are produced in the coking of coal. This chemical is converted into ammonium sulphate for use in the chemical industry, primarily as a component of fertilizers, by absorption in sulphuric acid. The provision of a more economical source of sulphate ion would be of great advantage to the industry. This advantage would be enhanced if the resulting ammonium sulphate were of higher quality than can be produced by conventional means.

This invention relates to a process for treating coke oven ammonia gas or aqua ammonia, purified of its contaminants (notably sulphides and cyanides) by known means, with waste pickle liquor or liquor of similar composition, whereby the sulphate component of the waste pickle liquor is substituted for the sulphuric acid conventionally employed to manufacture ammonium sulphate from gaseous ammonia.

I am aware of the prior art, wherein waste pickle liquor has been treated with ammonia to recover hydrated iron oxides and ammonium sulphate by diverse means. These prior processes, however, operate either under superatmospheric conditions or on the batch principle, or both. The present invention relates to a novel method for completely precipitating the iron in waste pickle liquor at a high rate, by a continuous process or by a cyclic continuous process, to form a magnetic iron oxide of superior settling quality, by reaction with ammonia and air, the process being carried out at atmospheric pressure.

One of the obstacles to the successful operation of the prior processes has been the difficulty of producing the hydrated iron oxides in an easily filterable form. This also made it impossible economically to recover the ammonium sulphate solution mechanically held in the oxide sludge. This impediment is overcome in the present invention by producing the oxides in such physical form that very rapid settling occurs and provides for recovery of the entrapped salt solution by the well-known method of continuous decantation. This is an important advance in the art.

Where a solution of a ferrous salt is treated with an alkaline agent, complete precipitation of the ferrous iron cannot ordinarily be effected until the pH is raised above 9. In accordance with my invention, an aqueous slurry of ferrous sulphate and ammonia is agitated and one or more streams of air are fed to the slurry to oxidize ferrous iron to ferric iron. A particular merit of the invention is that it includes the discovery that, by proper proportioning of the reactants and by feeding air thereto in proper amounts, a rapid settling magnetic iron oxide, largely hydrated ferroso-ferric oxide is formed, which accomplishes complete precipitation of the iron in the liquor at a pH of 7.5 to 8.0. This will be recognized as an important discovery since it provides for the complete precipitation of ferrous iron at a pH value lower than that at which ferrous iron can normally be precipitated completely.

The hydrated iron oxide recovered by my process can advantageously be sintered for charging to blast furnaces or can be used as a pigment or by suitable treatment can be converted into other iron oxide pigments.

In the accompanying drawings which illustrate, in a somewhat diagrammatical manner, one form of apparatus for carrying out the process, Figure 1 is a diagrammatic illustration of the system as a whole;

Figure 2 is a plan view of a shrouded impeller;

Figure 3 is a vertical section taken on the line III—III of Figure 2; and

Figure 4 illustrates the shearing action of the shrouded impeller blades.

My process is based upon a controlled oxidation of the ferrous hydroxide resulting from the reaction between ammonia and an aqueous solution of ferrous sulphate. Suitably proportioned streams of waste pickle liquor and gaseous or aqua ammonia are fed to a reaction chamber equipped with an agitator of such design as will provide for efficient dispersion of a stream, or streams, of air admitted thereto. The operation of the process may be either continuous or cyclic continuous. The latter method of operation permits a higher conversion of waste pickle liquor per unit of time than the former, as will be shown hereinafter.

The reaction is carried out at a temperature between about 50 and about 100° C., the preferred temperature being about 65° C. and the preferred range being between 55 and 80° C. If the temperature is too low the process will not operate satisfactorily. On the other hand, there is no harm in operating at temperatures above the preferred temperature of 65° C. except that as the temperature increases the tendency to boil off ammonia increases. The temperature of the reactants may be raised initially as by injection of steam. During the normal operation the reaction is sufficiently exothermic to maintain the preferred temperature of 65° C. and it may even be necessary to provide cooling means for maintaining the preferred temperature of reaction.

The process may be conducted in a cylindrical vessel which is relatively tall in proportion to its diameter. A tank whose height is approximately three times its diameter is preferred but the relation of height to diameter is not limited to this proportion.

Referring more particularly to the accompanying drawings, a cylindrical reaction vessel 2 is equipped with suitable means for providing agitation and aeration. As shown, a vertically extending impeller shaft 3 is driven by a motor 4. Shrouded impellers 5 are fixed to the shaft 3. As shown in Figures 2 and 3, each impeller has a hub 6 which fits on the shaft 3. Curved impeller blades 7 are secured to this hub. Two annular rings 8 and 9 are secured to the top and bottom of the blades, each ring providing an opening 10 adjacent the outside of the hub. The impeller also is open at its periphery 11. Ammonia gas or aqua ammonia is supplied through a pipe 12, flows through a flowmeter 13 and a valve 14, and is delivered adjacent the bottom of the reaction vessel 2. Spent pickle liquor is supplied through a pipe 15, flows through a flowmeter 16 and valve 16a and is delivered to the reactor adjacent its bottom. Compressed air flows through a pipe 17, flowmeter 18 and pipe 19. It then flows through branch pipes 20 controlled by valves 21 and is delivered to the reactor 2 adjacent the opening 10 of each of the shrouded impellers 5 which thoroughly mix the air and slurry and discharge the mixture from the periphery of the impeller. The reactor is provided with an overflow pipe 22 adjacent its top, a pipe 23 and valve 24 for use in carrying out the cyclic continuous process hereinafter described and a drain pipe 25 provided with valve 26. The reactor also is provided with a vertical baffle 27 fastened to the wall and extending the full depth of the reactor to provide turbulence.

The action of the shrouded impeller 5 is illustrated in Figure 4. As the impeller rotates in the liquid and air is supplied to it from the pipes 20, a layer of liquid 30 containing bubbles of air 31 is forced outwardly along the impeller blade 7. As each succeeding portion of the layer of liquid which contains a bubble of air reaches the outer edge 32 of the blade, the edge of the blade shears the layer and converts the bubble into a thin film of air 33 thereby increasing the rate of diffusion of the oxygen of the air into the liquid. This rate of diffusion is much greater than can be obtained by diffusing air into a liquid by means of a diffuser element composed of a porous material such as porous carbon. Furthermore, porous diffuser elements clog up in use.

The process can be carried out by a continuous method or by a cyclic continuous method.

The continuous method is as follows: Waste pickle liquor and ammonia gas pass through the flowmeters 16 and 13 which proportion their rate of flow in such a manner that there is always present a slight excess of ammonia, for example, 2.5% excess ammonia above the stoichiometric requirement of the waste pickle liquor. Aqua ammonia may be used in place of ammonia gas, if desired. These streams of reactants are fed to the bottom of the reactor, the shaft 3 is driven at such a rate that the peripheral velocity of the impeller blades 7 is approximately 700 feet per minute and air is fed to the impellers through the air supply pipes 20. As the reactor fills, live steam is admitted as occasion demands to raise the temperature of the reaction mixture above 50° C. and preferably to a temperature of about 65° C. As the reactor fills with slurry, the pickle liquor, ammonia and air feeds are so regulated that the atomic ratio of ferric iron to ferrous iron is within the range of 2:1 to 3.5:1, the preferred ratio being between 2:1 and 2.5:1. When the reactor is filled, the slurry overflows from pipe 22.

The object in controlling the ratio of ferric iron to ferrous iron is to produce a rapidly settling magnetic iron oxide which consists largely of hydrated ferroso-ferric oxide having the formula $1Fe_2O_3.1FeO.xH_2O$. It will be noted that in ferroso-ferric oxide the atomic ratio of ferric iron to ferrous iron is 2:1. The atomic ratio of ferric iron to ferrous iron must be at least 2:1 in order to insure the precipitation of all iron from the solution. However, as the ratio of ferric iron to ferrous iron increases substantially above 2:1, that is, to a value greater than 3.5:1, the precipitated magnetic iron oxide tends to settle more slowly. Within the atomic ratio of ferric iron to ferrous iron of 2:1 to 3.5:1, all of the iron is precipitated, thereby producing an iron-free ammonium sulphate solution and the magnetic iron oxide settles rapidly. In carrying out the process it is desirable to maintain the atomic ratio of ferric iron to ferrous iron only slightly above 2:1, say between 2:1 and 2.5:1, or better still between 2:1 and 2.2:1. This results in a rapidly settling magnetic iron oxide precipitate and an iron-free ammonium sulphate solution.

The oxide slurry withdrawn from the reactor is settled, the supernatant decanted and the sludge washed by decantation until the desired degree of ammonium sulphate recovery is attained. Ammonium sulphate is recovered from the combined strong liquor and wash water by evaporation.

The process may be carried out in a cyclic continuous manner instead of by the continuous operation which has just been described. It has been found that the average rate of conversion of pickle liquor can be increased substantially by operating in a cyclic continuous manner as follows: The reactor is drained by opening the valve 24 until it is approximately half full of slurry from a previous run. Pickle liquor, ammonia and air feeds are turned on and the feeding is continued until the level of slurry has risen almost to the overflow pipe 22. Ammonia and pickle liquor feeds are then turned off but the oxidation of the slurry is continued by maintaining the air feed until the atomic ratio of ferric iron to ferrous iron in the hydrated oxide is slightly over 2:1. This ratio may be anywhere between 2:1 and 3.5:1. A portion of the slurry is then removed from the reactor by draining it to the half-way mark, the portion of the slurry removed from the reactor is allowed to settle, the supernatant decanted, the sludge washed and ammonium sulphate is recovered by evaporation of the combined strong liquor and wash water as previously described. The portion of slurry remaining in the reaction vessel is then utilized for repeating the cycle which has been described.

While in the cyclic continuous process it is necessary to start with a quantity of slurry from a previous run, it is not necessary that the quantity from the previous run constitute approximately one-half of the total slurry treated in this process. Furthermore, in the preferred method as described, the feed of ammonia and pickle liquor was stopped completely during the oxidation period in which the atomic ratio of ferric iron to ferrous iron was raised to over 2:1. During this oxidation period it is not necessary to stop the feed of ammonia and pickle liquor completely. They could be continued during this period provided the rate of air supply is sufficient to raise the atomic ratio of ferric oxide to ferrous oxide above 2:1. However, if the pickle liquor and ammonia feeds are not shut off completely, the process will be less efficient.

In carrying out my invention by the cyclic continuous process I employ a feed period followed by an oxidation period. During the feed period I form a bath by feeding ammonia and an aqueous solution of ferrous sulphate to a reaction zone while supplying air to the bath to oxidize some but not all of the iron to ferric iron. The rate of feed of ferrous sulphate solution during the feed period is such that a substantial amount of iron remains in solution in the bath at the end of the feed period. The amount of iron in solution at the end of the feed period is preferably between .5 gram and 1 gram per liter of solution, but it may be as low as .1 gram per liter or as high as 5 grams per liter. Following the feed period, the bath is subjected to an oxidation treatment, during which the bath is agitated and air is supplied to it, but the feeds of ferrous sulphate solution and ammonia are cut off. The oxidation treatment is continued until the atomic ratio of ferric iron to ferrous iron in the precipitated oxide is between 2:1 and 3.5:1 and until substantially no iron remains in solution, by which I mean that at the end of the oxidation period the solution contains not over .05 gram of iron per liter.

The oxidation period may vary over a considerable range depending upon the amount of iron left in solution at the end of the feed period and depending also upon the quality of the oxide to be produced. Assuming a fixed air feed rate, where pickle liquor is fed to the reactor at a relatively low rate, the supernatant from the oxide product will contain no unprecipitated iron at the end of the feed period. As the pickle liquor feed rate is increased, a point is reached at which unprecipitated iron is present in the supernatant at the end of the feed period, necessitating further oxidation to effect its precipitation. This is accomplished by stopping the pickle liquor and ammonia feeds while the air feed is continued until substantially all of the soluble iron has been precipitated by oxidation to ferric hydrate. As the pickle liquor feed rate is increased further, the soluble iron in the supernatant at the end of the feed period will increase in proportion, requiring a corresponding increase in the length of the oxidation period. As the pickle liquor feed rate continues to increase, the pickle liquor conversion rate also increases but at a lower and lower rate because the oxidation period becomes a greater and greater proportion of the total cycle time. Eventually, for a given air feed rate, a point is reached at which the pickle liquor conversion rate becomes a maximum.

As the point of maximum pickle liquor conversion rate is approached, however, the quality of the oxide product, as measured by its settling rate, begins to deteriorate. This is illustrated in the following tabulation:

| Run No. | (1) | (2) |
| --- | --- | --- |
| W. P. L. feed rate, cc./min | 290 | 320 |
| W. P. L. conversion rate, cc./min | 219 | 232 |
| Length of feed period, min | 24.7 | 23.7 |
| Length of oxidation period, min | 5.0 | 6.0 |
| Ratio of oxidation period to feed period | .203 | .254 |
| Settling rate, per cent min | 32.8 | 24.5 |

Referring to runs No. 1 and No. 2, it is seen that in run No. 1 the oxidation period is 20.3% of the feed period, whereas in run No. 2 it is 25.4%. It is to be noted further that the quality of the oxide product, as shown by the settling rate, was substantially better in the case of run No. 1 than for run No. 2. On the basis of extensive experimental work, I prefer to hold the oxidation period to a value not over 25% of the length of the feed period, but I do not limit my method of operation to such a value. The process has been operated with an oxidation period which was 63.5% of the feed period but the quality of the oxide was not as good. On the other hand, an oxidation period as low as 5% of the feed period resulted in an oxide product of high quality and a markedly increased waste pickle liquor conversion rate as compared with a process in which the feed rate was so low that no subsequent oxidation treatment was required. In carrying out my invention the oxidation period is always of such length of time that substantially no iron remains in solution at the completion of this period. If, in my process, the oxidation period is relatively short, the conversion rate for the overall process is relatively small, but the quality of the oxide produced is relatively high. On the other hand, if, in my process, the oxidation period is relatively long, the conversion rate for the overall process is relatively high but the oxide product tends to be of poorer quality, as shown by its decreased settling rate. While in carrying out my cyclic continuous process the oxidation period may be as low as 5% or as high as 63% of the feed period, I prefer that it be between 15 and 30% of the feed period.

The data from a typical cycle for the cyclic continuous method of operation as obtained from a reactor with a capacity of 25 liters are given in Table I below. The reactant rates for this cycle were: waste pickle liquor (containing 60 grams iron per liter), 320 ml./min.; air, 17.1 l./min.; ammonia, 33.55 l./min.; the gases were measured at 70° F. and 760 mm. of mercury.

*Table I.—Cyclic continuous operation*

| Sequence | Duration, Min. | pH | Atomic Ratio, Ferric Ferrous | Fe in Sup't., g./l. | Per Cent Settled in 5 min. |
|---|---|---|---|---|---|
| Feed period | 25 | 8.05 | 1.44:1 | 0.87 | |
| Oxidation period | 6 | 7.70 | 2.23:1 | 0.00 | |
| Drain period | 3 | | | | |

The figures given in the table refer to measurements taken at the conclusion of the respective operations.

The advantage of cyclic continuous over continuous operation is shown by the fact that the former corresponds to an average pickle liquor conversion rate of 236 ml./min., whereas, in continuous operation of the same equipment, the maximum conversion rate was 180 ml./min. This is equivalent to a 30 per cent increase in capacity.

Wilson Patent No. 2,419,240 discloses treating waste pickle liquor with ammonia solution to produce a precipitate of ferroso-ferric hydrate. This patent emphasizes that in carrying out the reaction, the dilution of the ammonium salt must be maintained so high and the iron salt must be introduced into the bath so slowly that substantially no iron exists in soluble form in the bath. My invention provides a method whereby waste pickle liquor can be converted at a much higher rate than by the process of the Wilson patent, which, of course, is a distinct advantage. While the Wilson patent states that the process of his Example I results in a clear water-white solution of ammonium sulphate which showed no test for soluble iron when it was made ammoniacal and treated with hydrogen peroxide, I have duplicated his Example 1, carrying out the reaction in a 4 liter beaker, and have found that the resultant ammonium sulphate solution contained about .06 gram of iron per liter.

I have also carried out tests in accordance with Wilson's Example I, employing the reactor used in the development of my process. For carrying out the example of Wilson's process in this reactor, the agitator of Figure 1 was removed and two diffuser stones were installed for dispersing the air fed to the reactor. Pickle liquor and ammonia were fed to the bottom of the reactor as indicated in Figure 1.

Wilson fed pickle liquor to a 4000 volume reactor at a rate of 20 volumes per minute. On the same basis, my reactor had a capacity of 25,000 volumes and the rate of pickle liquor fed to it should then have been 125 volumes per minute ($25000/4000 \times 20 = 125$).

Two tests of Wilson's example were made. In the first test the pickle liquor feed rate was 100 ml./min., and in the second, 75 ml./min. The data referring to the tests are as follows:

Acid value, pickle liquor, 200.4 g. SO₄/l.
Iron value, pickle liquor, 60.0 g. Fe/l.
Ammonia solution, 155.9 g. NH₃/l.
Volume of water in reactor at start of test, 6.5 l.
Volume of ammonia solution in reactor at start of test, 1.5 l.

| | Test No. 1 | Test No. 2 |
|---|---|---|
| Feed rate, pickle liquor | 100 | 75 ml./min. |
| Feed rate, ammonia | 50 | 37.5 ml./min. |
| Feed rate, air | 25 | 25 l./min. |
| Length of feed period | 75 | 93 min. |
| Excess ammonia used | 54 | 57%. |
| Temperature | 75–80 | 75–80° C. |
| Settling rate of oxide (per cent Settled in 5 min.) | 91 | 90. |
| Ferric/Ferrous ratio of oxide | 2.15 | 2.36–3.01. |
| pH | 8.8 | 8.8. |
| Iron in ammonium sulphate solution | 0.82 | 0.00 g./l. |

These data show that at a pickle liquor feed rate of 100 ml./min. it was not possible to produce an iron-free supernatant. To do so it was necessary to reduce this rate to 75 ml./min.

The data given by Wilson for his Example I show that he fed ammonia at a rate more than 50% higher than the stoichiometric requirement of the pickle liquor feed. But in his specification, Wilson states that " . . . the mixture need not have a pH much greater than 7, and satisfactory results are obtained when only the faintest odor of ammonia from the reaction mixture is detectable." I have, in consequence, duplicated his Example I, with the exception that the amount of ammonia fed was slightly more than 2% in excess of the stoichiometric requirement of the pickle liquor fed. Two tests were made, test No. 3 with a pickle liquor feed rate of 75 ml./min., and test No. 4 with a pickle liquor feed rate of 50 ml./min. There was a distinct odor of ammonia over the reaction mixture at all times in both tests. The data were as follows:

Acid value, pickle liquor, 200.4 g. SO₄/l.
Iron value, pickle liquor, 60.0 g. Fe/l.
Ammonia solution, 155.9 g. NH₃/l.
Volume of water in reactor at start of test, 8.0 l.
Volume of ammonia solution in reactor at start of test, 0.0 l.

| | Test No. 3 | Test No. 4 |
|---|---|---|
| Feed rate, pickle liquor | 75 | 50 ml./min. |
| Feed rate, ammonia | 34.8 | 23.3 ml./min. |
| Feed rate, air | 25 | 17 l./min. |
| Length of feed period | 90 | 120 min. |
| Excess ammonia used | 2.05 | 2.28%. |
| Temperature | 75–80 | 75–80° C. |
| Settling rate of oxide (Per Cent Settled in 5 min.) | 92 | 92. |
| Ferric/ferrous ratio of oxide | 2.18–3.61 | 2.45–5.43. |
| pH | 7.95 | 8.05. |
| Iron in ammonium sulphate sol | 0.21 | 0.03 g/l. |

These data show that when the ammonia was reduced to the level specified by Wilson, but not used by him in his example, an iron-free supernatant could be produced only where the pickle liquor feed was reduced to 50 ml./min., or 40% of the pickle liquor rate it should have been possible to use according to the Wilson patent.

Table I shows that, using my process in cyclic continuous operation, pickle liquor was fed at a rate of 320 ml./min. for 25 minutes. The feed period was followed by an oxidation period of 6 minutes and a drain period of 3 minutes, giving a total cycle time of 34 minutes. The net pickle liquor rate was, then, 236 ml./min. ($320 \times 25/34 = 236$). Thus, with an excess of ammonia of slightly more than 2%, my process will convert pickle liquor at a rate of 236 ml./min. and produce an iron-free supernatant, whereas in the same size reactor Wilson's process converted only 50 ml./min. Thus the rate of pickle liquor conversion by my process is about five times that of Wilson (236/50=4.72).

I have duplicated the process of Wilson's Example II, which process is carried out without aeration, and have found that the settling rate of the precipitate was much slower than in my process. According to the Wilson example, only 38% by volume had settled after 20 minutes and it required 40 minutes to settle 60%, whereas according to my process, as shown in Table I, 92% settled in 5 minutes.

Although this invention has been described as applied to the treatment of waste sulphate pickle liquor, it will be understood that it applies equally as well to the treatment of waste chloride pickle liquor, in which case the products of the reaction will be ammonium chloride and a rapidly settling magnetic iron oxide.

The above description of the apparatus and of typical runs are given as examples only, and are not to be construed as limiting the scope of the invention since various modifications may be made within the scope of the following claims without departing from my invention.

I claim:

1. A process for producing pure ammonium salt and a rapidly settling magnetic iron oxide, which comprises carrying out a first step by mixing streams of ammonia, an aqueous solution of ferrous salt and air in a reaction zone to form a bath, regulating said streams so that at the end of said first step the bath contains in solution from 0.1 gram to 5 grams of iron per liter and the bath contains precipitated iron oxide in which the atomic ratio of ferric iron to ferrous iron is less than 2, thereafter in a second step subjecting the bath to an oxidation treatment during an oxidizing period by agitating the bath and supplying air to it in a greater proportion relative to the ferrous salt than was used during the first step and until the atomic ratio of ferric iron to ferrous iron in the precipitated oxide is between 2:1 and 3.5:1 and until the bath contains substantially no iron in solution, said steps being carried out at atmospheric pressure and with an excess of ammonia above the stoichiometric requirements of said ferrous salt, and separating the precipitate from the solution.

2. A process according to claim 1, wherein the duration of said second step is less than about 25% of said first step.

3. A process according to claim 1, wherein the duration of said second step is from 5 to 30% of said first step.

4. A process according to claim 1, wherein said second step is carried out without supplying ferrous salt solution to the bath.

5. A process for producing pure ammonium salt and a rapidly settling magnetic iron oxide, which comprises providing in a reaction vessel a slurry of iron oxide and ammonium salt solution, carrying out a first step by feeding streams of ammonia, an aqueous solution of ferrous salt and air to said slurry to form a bath, regulating said streams so that at the end of said first step the bath contains in solution from 0.1 gram to 5 grams of iron per liter and the bath contains precipitated iron oxide in which the atomic ratio of ferric iron to ferrous iron is less than 2, thereafter in a second step subjecting the bath to an oxidation treatment during an oxidizing period by agitating the bath and supplying air to it in a greater proportion relative to the ferrous salt than was used during the first step and until the atomic ratio of ferric iron to ferrous iron in the precipitated oxide is between 2:1 and 3.5:1 and until the bath contains substantially no iron in solution, said steps being carried out at atmospheric pressure and with an excess of ammonia above the stoichiometric requirements of said ferrous salt, removing a portion of the slurry from the reaction vessel, treating the removed portion of slurry to separate the precipitate from the solution of ammonium salt, and utilizing the portion of the slurry remaining in the reaction vessel for repeating said first and second steps.

RICHARD D. HOAK.

REFERENCES CITED

The following references are of record in the file of this patent:

UNITED STATES PATENTS

| Number | Name | Date |
|---|---|---|
| 961,764 | Falding | June 21, 1910 |
| 997,237 | Carrick | July 4, 1911 |
| 1,994,702 | Harris | Mar. 19, 1935 |
| 2,165,889 | Fischer et al. | July 11, 1939 |
| 2,178,239 | McKenna | Oct. 31, 1939 |
| 2,419,240 | Wilson | Apr. 22, 1947 |
| 2,427,555 | Elzi | Sept. 16, 1947 |

FOREIGN PATENTS

| Number | Country | Date |
|---|---|---|
| 1,050 | Great Britain | Nov. 8, 1906 |
| 433,333 | Great Britain | Aug. 13, 1935 |

Certificate of Correction

Patent No. 2,529,874                      November 14, 1950

RICHARD D. HOAK

It is hereby certified that error appears in the printed specification of the above numbered patent requiring correction as follows:

Column 7, lines 14 to 21 inclusive, in the table, column 6 thereof, for

| Per Cent Settled in 5 min. |
|---|
| ---------- |
| ---------- |
| ---------- | read

| Per Cent Settled in 5 min. |
|---|
| ---------- |
| ---------- |
| ---------- 95 | and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*